(12) United States Patent
Quinn et al.

(10) Patent No.: US 6,582,829 B1
(45) Date of Patent: *Jun. 24, 2003

(54) HOT MELT ADHESIVE COMPOSITION COMPRISING HOMOGENEOUS ETHYLENE INTERPOLYMER AND BLOCK COPOLYMER

(75) Inventors: Thomas H. Quinn, St. Paul, MN (US); Janelle C. Cameron, Mendota Heights, MN (US); Beth M. Eichler-Johnson, St. Paul, MN (US); Michael S. Keehr, Minneapolis, MN (US); Jeffrey S. Lindquist, Maple Grove, MN (US); David B. Malcolm, Maplewood, MN (US); Kevin W. McKay, White Bear Lake, MN (US); Deepak R. Parikh, Lake Jackson, TX (US)

(73) Assignee: H.B. Fuller Licensing & Financing Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/345,684

(22) Filed: Jun. 30, 1999

Related U.S. Application Data

(63) Continuation-in-part of application No. 09/108,338, filed on Jun. 30, 1998, now abandoned, which is a continuation-in-part of application No. 08/973,779, filed on Jan. 8, 1998, which is a continuation-in-part of application No. 08/615,751, filed on Mar. 14, 1996, now abandoned, which is a continuation-in-part of application No. 08/615,750, filed on Mar. 14, 1996, now abandoned.

(51) Int. Cl.$^7$ .......................... B32B 23/08; C08L 53/00
(52) U.S. Cl. .......................... 428/513; 524/505; 525/98
(58) Field of Search .................. 524/505; 428/513; 525/98

(56) References Cited

U.S. PATENT DOCUMENTS

| | | | |
|---|---|---|---|
| 3,253,059 A | 5/1966 | Vollmer et al. ............. | 260/897 |
| 4,914,253 A | 4/1990 | Chang ........................ | 585/523 |
| 4,956,207 A | 9/1990 | Kauffman et al. .......... | 428/34.2 |
| 5,093,442 A | 3/1992 | Himes ......................... | 525/98 |
| 5,272,236 A | 12/1993 | Lai et al. ................. | 526/348.5 |
| 5,278,272 A | 1/1994 | Lai et al. ................. | 526/348.6 |
| 5,377,843 A | 1/1995 | Schumacher ............. | 209/139.2 |
| 5,530,054 A | 6/1996 | Tse et al. ................. | 524/474 |
| 5,548,014 A | 8/1996 | Tse et al. ................. | 525/240 |
| 5,591,792 A | 1/1997 | Hattori et al. ............. | 524/271 |
| H1808 H | 10/1999 | Djiauw et al. ............. | 524/505 |

FOREIGN PATENT DOCUMENTS

| | | | |
|---|---|---|---|
| EP | 0 115 434 | 8/1984 | ............. C09J/3/14 |
| EP | 416815 | 3/1991 | ........... C08F/10/00 |
| EP | 0 442 045 A2 | 8/1991 | ......... C09J/123/14 |
| EP | 0 608 175 A1 | 7/1994 | ............. C09J/7/02 |
| WO | 92/12212 | 7/1992 | ......... C09J/123/16 |
| WO | 94/00500 A1 | 1/1994 | ........... C08F/10/00 |
| WO | 94/10256 | 5/1994 | ......... C09J/123/08 |
| WO | WO 95/33006 | 7/1995 | |
| WO | WO 98/03603 | * 1/1998 | |

OTHER PUBLICATIONS

International Search Report dated Jul. 3, 1997 issued by the EPO acting as the International Searching Authority in PCT US97/04161.

Hawley's Condensed Chemical Dictionary, 12$^{th}$ ed., Lewes ed., Van Nostrand Reinhold Co. New York, p. 806 (1993).

International Search Report dated Nov. 6, 1997 issued by the EPO acting as the International Searching Authority in PCT US97/12366.

Tse, "Application of Adhesion Model for Developing Hot Melt Adhesives Bonded to Polyolefin Surfaces", Journal of Adhesion, vol. 48, Issue 1–4, pp. 149–167 (1995).

\* cited by examiner

*Primary Examiner*—Peter D. Mulcahy

(57) ABSTRACT

A hot melt adhesive composition comprising a) from about 5 wt-% to about 50 wt-% of at least one homogeneous linear or substantially linear ethylene/alpha-olefin interpolymer characterized as having a density from 0.850 to 0.965 g/cm$^3$; b) from about 1 wt-% to about 40 wt-% of at least one block copolymer; and c) from about 10 wt-% to about 75 wt-% of at least one tackifying resin wherein said adhesive does not fail cohesively.

57 Claims, 4 Drawing Sheets

HOT MELT ADHESIVE COMPOSITION COMPRISING HOMOGENEOUS ETHYLENE INTERPOLYMER AND BLOCK COPOLYMER

Related Applications

This application is a continuation-in-part of Ser. No. 09/108,338 filed Jun. 30, 1998 now abandoned which is a continuation-in-part of Ser. No. 08/615,751 filed Mar. 14, 1996 now abandoned and a continuation-in-part of Ser. No. 08/973,779 filed Jan. 8, 1998 pending which is a continuation-in-part of Ser. No. 08/615,750 filed Mar. 14, 1996 now abandoned; all of which are incorporated herein by reference.

BACKGROUND OF THE INVENTION

WO 95/33006 published Dec. 7, 1995 relates to a thermoplastic elastomer blend comprising 50% to 99% by weight of at least one styrenic block copolymer and 1% to 50% by weight of at least one homogeneously branched ethylene interpolymer having a density from 0.855 g/cc to 0.905 g/cc wherein the ethylene interpolymer in the amount employed is a substantially inert extender characterized by certain properties. Exemplified are compositions containing certain S-I-S species as well as a mixture of Kraton G-1650 and Engage 8100 at weight ratios of 1:3 to 3:1.

SUMMARY OF THE INVENTION

The present invention is a hot melt adhesive composition comprising at least one homogeneous ethylene/α-olefin interpolymer which is an interpolymer of ethylene and at least one $C_3$–$C_{20}$ α-olefin and at least one block copolymer. Preferably, the concentration of the homogeneous ethylene/α-olefin interpolymer ranges from about 5 wt-% to about 40 wt-%, whereas the concentration of the block copolymer ranges from about 1 wt-% to about 40 wt-%, more preferably from about 10 wt-% to about 20 wt-%. The adhesive composition further comprises at least one additional hot melt adhesive ingredient including tackifiers, plasticizers and waxes. In the case of pressure sensitive adhesives, at least one tackifying resin and a plasticizing oil are preferred, whereas for non-pressure sensitive adhesive compositions at least one tackifying resin and at least one wax is preferred. The tackifier is preferably employed at a concentration of at least about 30 wt-%.

The homogeneous ethylene/α-olefin interpolymer preferably has a density ranging from 0.850 to about 0.885 $g/cm^3$. To minimize the molten viscosity of the adhesive composition, the homogeneous ethylene/α-olefin interpolymer preferably has a melt index of greater than about 10 grams/10 minutes, more preferably greater than about 30 g/10 minutes, even more preferably greater than about 100 g/10 minutes, and most preferably greater than about 500 g/10 minutes.

The block copolymer is preferably a hydrogenated block copolymer having non-elastomeric end-blocks of styrene and a rubbery mid-block of ethylene/propylene, ethylene/butylene or mixtures thereof. For low viscosity adhesive compositions, preferably the block copolymer has a solution viscosity of less than about 5000 cps for a 25 wt-% solution of block copolymer. Further, for increased cohesive strength, the block copolymer preferably contains a minimal amount of diblock ranging from 0 wt-% to about 20 wt-%. For high performance pressure sensitive adhesives, preferably a saturated block copolymer having a high vinyl content midblock is employed.

The adhesive compositions are useful for a variety of end-use hot melt pressure sensitive adhesive applications including removable grades, semi-permanent and permanent grades, as well as freezer grade adhesive compositions. The inventive pressure sensitive adhesive compositions exhibit good heat resistance, enhanced non-staining characteristics and reduced residual transfer tendencies. These compositions also exhibit superior adhesion and superior resistance to ultraviolet (UV) light. Accordingly, the compositions are well suited for a variety of tape and label applications, particularly those having paper substrate backings, as well as positioning adhesives for feminine napkins. Due to the heat and UV light resistance, the adhesive compositions also find utility in a variety of "high performance" tape and label applications including packaging tapes, tape applications for automobiles, carpet tapes, "hook and loop" applications (Velcro®), labels for windows (automobile, boat and construction industries), labels for appliances and electronics, shelf marking adhesives and so forth. The novel pressure sensitive adhesives may also be utilized for bookbinding applications including lining-up, tightbacking, book joint, side glue, puzzle and gameboard lamination, thread-securing or gluing-off, facing and slip cases. Such applications however, may also employ non-pressure sensitive adhesives.

The inventive non-pressure sensitive adhesive compositions find particular utility in paper packaging and bookbinding applications such as one shot or perfect bookbinding, two shot bookbinding, Rep-Kover, casing-in and casemaking. In the case of low temperature applied hot melts, both the set temperature and the heat resistance is substantially improved, whereas in the case of bookbinding adhesive, the composition exhibits enhanced tensile strength in combination with improved heat resistance while maintaining a low molten viscosity.

BRIEF DESCRIPTION OF THE DRAWINGS

FIGS. 1 to 3 illustrate effects diagrams for hot melt pressure sensitive adhesive compositions, whereas FIGS. 4 to 8 depict effects diagrams for hot melt adhesives particularly useful for bookbinding applications.

DETAILED DESCRIPTION OF THE INVENTION

Figure 1:
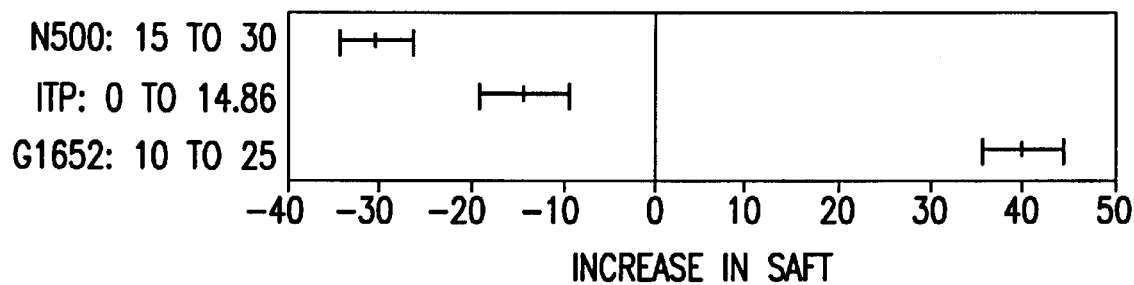
FIGS. 1 to 8 depict effects diagrams that were generated using RS/1 experimental design software. Effects diagrams depict the change in a response with respect to a change in concentration of an ingredient from a minimum to a maximum of a range while the other ingredients are held constant. The constant amounts, called the reference mixture, are the average formulation in the design.

Hot melt adhesives are thermoplastic compositions that are applied in a molten or flowable form. For many applications, hot melt adhesives are employed to bond two or more substrates while the adhesive is sufficiently molten. In other instances, the adhesive may be applied to a single substrate and cooled. The adhesive is subsequently bonded to a second substrate or surface with heat re-activation or by means of the surface tack of the cooled adhesive in the case of pressure sensitive adhesives. For the purpose of the invention, "hot melt adhesive" refers to all such adhesive compositions. Further, in the case of "pressure sensitive" hot melt adhesives, the composition possesses sufficient internal strength such that it does not fail cohesively.

The adhesive composition of the invention comprises at least one homogeneous ethylene/α-olefin interpolymer which is an interpolymer of ethylene and at least one $C_3$–$C_{20}$ α-olefin. The term "interpolymer" is used herein to indicate a copolymer, or a terpolymer, or a higher order polymer. That is, at least one other comonomer is polymerized with ethylene to make the interpolymer.

Homogeneous ethylene/α-olefin interpolymers differ from amorphous polyolefins also described as amorphous polyalphaolefins (APAO), with regard to homogeneity, molecular weight distribution ($M_w/M_n$), as well as comonomer (α-olefin) content. Amorphous polyolefins are homopolymers, copolymers and terpolymers of $C_2$–$C_8$ α-olfins which are typically polymerized by means of processes which employ Ziegler-Natta catalysts, resulting in a relatively broad molecular weight distribution, typically greater than 4. In contrast, the homogeneous ethylene/α-olefin interpolymers useful in the inventive adhesive composition are characterized as having a narrow molecular weight distribution. The homogeneous ethylene/α-olefins have a $M_w/M_n$ of less than 4, preferably less than 3, more preferably from 1.5 to 2.5, even more preferably from 1.8 to 2.2, and most preferably about 2.0. Further, whereas amorphous polyolefins produced from Ziegler-Natta catalysis typically have an α-olefin concentration greater than 50 wt-%, homogeneous ethylene/α-olefin interpolymers useful in the present invention are predominantly ethylene, having a greater ethylene content than comonomer content.

It is also noted that substantially linear interpolymers useful in the invention differ from low density polyethylene prepared in a high pressure process. In one regard, whereas low density polyethylene is an ethylene homopolymer having a density of from 0.900 to 0.935 g/cm$^3$, the homogeneous linear and substantially linear interpolymers useful in the invention require the presence of a comonomer to reduce the density.

The homogeneous ethylene/α-olefin interpolymer is a homogeneous linear or substantially linear ethylene/α-olefin interpolymer. By the term "homogeneous", it is meant that any comonomer is randomly distributed within a given interpolymer molecule and substantially all of the interpolymer molecules have the same ethylene/comonomer ratio within that interpolymer. The melting peak of homogeneous linear and substantially linear ethylene polymers, as obtained using differential scanning calorimetry, will broaden as the density decreases and/or as the number average molecular weight decreases. However, unlike heterogeneous polymers, when a homogeneous polymer, prepared in a solution polymerization process, has a melting peak greater than 115° C. (such as is the case of polymers having a density greater than 0.940 g/cm$^3$), it does not additionally have a distinct lower temperature melting peak.

Substantially linear ethylene interpolymers are homogeneous interpolymers having long chain branching. Due to the presence of such long chain branching, substantially linear ethylene interpolymers are further characterized as having a melt flow ratio ($I_{10}/I_2$) which may be varied independently of the polydispersity index, and the like, the molecular weight distribution $M_w/M_n$. This feature accords substantially linear ethylene polymers with a high degree of processability despite a narrow molecular weight distribution.

The long chain branches of substantially linear ethylene interpolymers have the same comonomer distribution as the interpolymer backbone and can be as long as about the same length as the length of the interpolymer backbone. When a substantially linear ethylene/α-olefin interpolymer is employed in the practice of the invention, such interpolymer will be characterized as having an interpolymer backbone substituted with from 0.01 to 3 long chain branches per 1000 carbons.

Methods for determining the amount of long chain branching present, both qualitatively and quantitatively, are known in the art.

The homogeneous ethylene/α-olefin interpolymer is an interpolymer of ethylene with at least one comonomer selected from the group consisting of $C_3$–$C_{20}$ (α-olefins, non-conjugated dienes, and cycloalkenes. Exemplary $C_3$–$C_{20}$ α-olefins include propylene, isobutylene, 1-butene, 1-hexene, 4-methyl-1-pentene, 1-heptene, and 1-octene. Preferred $C_3$–$C_{20}$ α-olefins include 1-butene, 1-hexene, 4-methyl-l-pentene, 1-heptene, and 1-octene, more preferably 1-hexene and 1-octene. Exemplary cycloalkenes include cyclopentene, cyclohexene and cyclooctene. The non-conjugated dienes suitable as comonomers, particularly in the making of ethylene/α-olefin/diene terpolymers, are typically non-conjugated dienes having from 6 to 15 carbon atoms. Representative examples of suitable non-conjugated dienes include:

(a) Straight chain acyclic dienes such as 1,4-hexadiene; 1,5-heptadiene; and 1,6-octadiene;

(b) Branched chain acyclic dienes such as 5-methyl-1,4-hexadiene; 3,7-dimethyl-1,6-octadiene; and 3,7-dimethyl-1,7-octadiene;

(c) Single ring alicyclic dienes such as 4-vinyl cyclohexene; 1-allyl-4-isopropylidene cyclohexane; 3-allyl cyclopentene; 4-allyl cyclohexene; and 1-isopropenyl-4-butenylcyclohexene;

(d) Multi-ring alicyclic fused and bridged ring dienes such as dicyclopentadiene; alkenyl, alkylidene, cycloalkenyl, and cycloalkylidene norbornenes, such as 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; and 5-cyclohexylidene-2-norbornene.

One preferred conjugated diene is piperylene. The preferred dienes are selected from the group consisting of 1,4-hexadiene; dicyclopentadiene; 5-ethylidene-2-norbornene; 5-methylene-2-norbornene; 7-methyl-1,6 octadiene; piperylene; and 4-vinyl cyclohexene.

The molecular weight of the homogeneous ethylene/α-olefin interpolymer will be selected on the basis of the desired performance attributes of the adhesive formulation. Typically, the homogeneous ethylene/α-olefin interpolymer will have a number average molecular weight of at least 800 grams/mole, preferably at least 1,300 and no more than 100,000 grams/mole. Ultra low molecular weight homogeneous ethylene/α-olefin interpolymers are considered to have a number average molecular weight of less than about 11,000 g/mole.

For adhesive applications in which high viscosity compositions are unproblematic, homogeneous ethylene/α-olefin interpolymers having a melt index as low as 0.25 g/10 min. may be employed. However, for the majority of hot melt adhesive applications, wherein it is desired to minimize viscosity, the homogeneous ethylene/α-olefin interpolymers typically have a melt index greater than about 10 g/10 min., more typically greater than about 20 g/10 min., preferably greater than about 30 g/10 min., more preferably greater than about 50 g/10 min., even more preferably greater than about 100 g/10 min., even more preferably greater than about 200 g/10 min. and most preferably the melt index ranges from about 500 g/10 min. to about 2500 g/10 min. Further, in some instances the melt index can range as high as 4000 g/10 min.

The melt index inversely relates to the molten viscosity. The viscosity at 350° F. (177° C.) ranges from about 2,000 cPs to about 2,000,000 cPs, preferably from about 3,500 cPs to about 1,000,000 cPs, and more preferably from about 5,000 cPs to about 100,000 cPs.

The density of the homogeneous ethylene/α-olefin interpolymer will be selected on the basis of the desired performance attributes of the adhesive formulation. Typically however, the homogeneous ethylene/α-olefin interpolymer will have a density of at least 0.850 g/cm$^3$, preferably at least 0.860 g/cm$^3$, and more preferably about 0.870 g/cm$^3$. For the majority of the preferred compositions for targeted adhesive applications, the homogeneous ethylene/α-olefin interpolymer will have a density of no more than 0.965 g/cm$^3$, preferably no more than 0.900 g/cm$^3$, more preferably no more than 0.890 g/cm$^3$, and even more preferably no more than 0.885 g/cm$^3$, and most preferably no more than 0.880 g/cm$^3$.

The homogeneous ethylene/α-olefin interpolymer will be present in the adhesive composition of the invention in an amount greater than about 5 wt-%, and preferably greater than about 10 wt-%. The homogeneous ethylene/α-olefin interpolymer will typically be present in the adhesive of the invention in an amount less than about 50 wt-%, preferably less than about 40 wt-%, and more preferably less than about 30 wt-%.

The adhesive composition comprises either a single homogeneous ethylene/α-olefin interpolymer or a blend of two or more interpolymers. In instances when a single homogeneous ethylene/α-olefin interpolymer is employed, the interpolymer will preferably have a density ranging from about 0.850 g/cm$^3$ to 0.885 g/cm$^3$ and a melt index of greater than about 100 g/10 min. In the case of homogeneous ethylene/α-olefin interpolymer blends, the density of the interpolymer blend will preferably possess the targeted density and melt index. However, the individual interpolymers comprising the blend may have a density and/or melt index outside of the specified range.

When employing two or more homogeneous ethylene/α-olefin interpolymers, the first and second interpolymer will differ from each other with respect to the type of comonomer and/or the molecular weight or melt index, and/or the density, and/or the molecular weight distribution. Accordingly, the first and second interpolymer may differ in number average molecular weight by at least 5000, preferably at least 10,000, and more preferably at least 20,000. In addition or in the alternative, the first and second interpolymers may differ in density by at least 0.005 g/cm$^3$, preferably by at least 0.01 g/cm$^3$.

Homogeneously branched linear ethylene/α-olefin interpolymers may be prepared using polymerization processes (for example, as described by Elston in U.S. Pat. No. 3,645,992) which provide a homogeneous short chain branching distribution. In his polymerization process, Elston uses soluble vanadium catalyst systems to make such polymers. However, others such as Mitsui Petrochemical Company and Exxon Chemical Company have used so-called single site catalyst systems to make polymers having a homogeneous linear structure. U.S. Pat. No. 4,937,299 to Ewen et al. and U.S. Pat. No. 5,218,071 to Tsutsui et al. disclose the use of catalyst systems based on hafnium for the preparation of homogeneous linear ethylene polymers. Homogeneous linear ethylene/α-olefin interpolymers are currently available from Mitsui Petrochemical Company under the trade name "Tafmer" and from Exxon Chemical Company under the trade name "Exact".

Substantially linear ethylene/α-olefin interpolymers are available from the Dow Chemical Company as Affinity® polyolefin plastomers and Engage® polyolefin elastomers. Substantially linear ethylene/α-olefin interpolymers may be prepared in accordance with the techniques described in U.S. Pat. No. 5,272,236 and in U.S. Pat. No. 5,278,272.

Ultra-low molecular weight polymers may also be suitably prepared using a constrained geometry metal complex, according to the procedures of U.S. Ser. No. 08/784,683, herein incorporated by reference in its entirety.

In addition to the homogeneous ethylene/α-olefin interpolymer, the adhesive of the present invention comprises at least one block copolymer present in an amount ranging from about 1 wt-% to about 40 wt-%, preferably from about 2 wt-% to about 30 wt-%, more preferably from about 5 wt-% to about 25 wt-%, and most preferably from about 10 wt-% to about 20 wt-%. At 1 wt-%, the effect is subtle but detectable. At concentrations below 1 wt-% the effect of the block copolymer tends to be so subtle that it is difficult to detect with most adhesive performance testing. At concentrations greater than about 40 wt-%, the viscosity tends to be too high for the majority of adhesive applications. Further, minimal block copolymer concentrations tend to be advantageous with respect to cost.

A wide variety of block copolymers are useful in the present invention including A-B-A triblock structures, A-B diblock structures, (A-B)$_n$ radial block copolymer structures, as well as branched and grafted versions of such, wherein the A endblock is a non-elastomeric polymer block, typically comprising polystyrene and/or vinyl, and the B block is an unsaturated conjugated diene or hydrogenated version thereof. In general, the B block is typically isoprene, butadiene, ethylene/butylene (hydrogenated butadiene), ethylene/propylene (hydrogenated isoprene) and mixtures thereof. Commercial embodiments include the Kraton® D and G series block copolymers, available from Shell Chemical Company (Houston, Tex.), Europrene® Sol T block copolymers available from EniChem (Houston, Tex.), Vector® block copolymers available from Exxon (Dexco) (Houston, Tex.), as well as others.

In general, block copolymers range in A block (styrene or vinyl) content from 0 wt-%, as in the case of multi-arm (EP)n$^8$ 100% diblock polymers, to about 50 wt-%. Typically, the non-elastomeric A block concentration ranges from about 5 wt-% to about 45 wt-% with respect to the weight of the block copolymer. For improved compatibility, particularly in the case of nonwoven and bookbinding adhesive compositions, block copolymers having a relatively low A block (styrene content) are preferred. In such instances the styrene content is preferably less than about 25 wt-%, more preferably less than about 20 wt-% and most preferably from about 5 wt-% to about 15 wt-% styrene with respect to the total weight of the block copolymer.

Block copolymers also range in diblock content from 0%, wherein the block copolymer is 100% coupled, to 100% diblock, as previously mentioned, preferably from about 0% to about 50% and most preferably from about 0% to about 30%. The preferred diblock content of the block copolymer depends on the selection of the homogeneous ethylene/α-olefin. When employed with a homogeneous ethylene/α-olefin having a relatively high melt index, preferably the block copolymer is predominantly triblock, having a low diblock content. In such instances, preferably the block copolymer has a diblock content of less than 30 wt-% and most preferably from 0 to 20 wt-% with respect to the weight of the block copolymer. For this embodiment the block copolymer contributes significantly to the cohesive strength of the adhesive composition. Alternatively, when employing a homogeneous ethylene/α-olefin having a melt index less than about 100 g/10 min., increasingly higher concentrations of diblock may be employed since the adhesive strength is contributed primarily by the homogeneous ethylene/α-olefin, rather than by the formation of styrene domains by the block copolymer.

The molecular weight of a block copolymer relates to its solution viscosity at 77° F. (25° C.) for a given weight of polymer in (toluene) solvent. The amount of block copolymer employed for determining the solution viscosity depends on the molecular weight. For the higher molecular weight block copolymers, the solution viscosity is typically expressed as a function of a 10 wt-% or 15 wt-% block copolymer solution, whereas for more conventional and lower molecular weight block copolymers, a 25 wt-% block copolymer solution is employed. For 10 wt-% or 15 wt-%, the solution viscosity of the block copolymer for use in the invention ranges from about 50 cPs to about 2000 cPs at about 77° F. (25° C.). For a 25 wt-% block copolymer solution, the solution viscosity may range from about 100 to about 100,000 cPs, preferably from about 200 to about 50,000 cPs, more preferably from about 200 to about 25,000 and most preferably from about 200 to about 10,000 cPs. For low viscosity adhesive compositions, preferably the solution viscosity of the block copolymer employed is less than 8000 cps, more preferably less than about 5000, even more preferably less than about 3000 cps and most preferably less than about 2000 for a 25 wt-% solution. Preferably, the block copolymer employed in the adhesive composition of the present invention is substantially fully hydrogenated in which the midblock is typically ethylene/butylene, ethylene/propylene, or mixtures thereof. Hydrogenated block copolymers tend to be most compatible. Further, the addition of such block copolymers does not diminish the outstanding thermal stability contributed by the homogeneous ethylene/α-olefin.

The majority of commercially available hydrogenated block copolymers are predominantly linear. Branched versions such as Kraton® GRP-69A having a styrene-ethylene/butylene-styrene backbone with isoprene side chains, as well as Kraton® G 1730, an S-EP-S-EP block copolymer having a terminal ethylene-propylene block rather than terminal polystyrene are most useful for increasing tack.

In addition to the essential homogeneous ethylene/α-olefin interpolymer and block copolymer, the adhesive compositions of the present invention comprise one or more tackifiers. As used herein, the term "tackifier" or "tackifying resin" means any of the compositions described below which are useful to impart tack to the hot melt adhesive composition. ASTM D-1878-61T defines tack as "the property of a material which enables it to form a bond of measurable strength immediately on contact with another surface".

The adhesive of the invention comprises from 10 wt-% to about 80 wt-% of a tackifying resin. When it is desired to employ less than 30 wt-% polymer, the adhesive will comprise from about 20 wt-% to about 75 wt-% and more preferably from 30 wt-% to about 65 wt-% tackifier, and most preferably from about 35 wt-% to about 60 wt-% tackifier.

In general terms, the tackifying resins useful in the adhesives of the invention comprise resins which may be derived from renewable resources such as rosin derivatives including wood rosin, tall oil and gum rosin, as well as rosin esters and natural and synthetic terpenes, and derivatives of such. Aliphatic, aromatic or mixed aliphatic-aromatic petroleum based tackifiers are also useful in the adhesives of this invention. Representative examples of useful hydrocarbon resins include alpha-methyl styrene resins, branched and unbranched $C_5$ resins, $C_9$ resins, $C_{10}$ resins, as well as styrenic and hydrogenated modifications of such. Tackifying resins range from being a liquid at about 25° C. (room temperature) to having a ring and ball softening point of about 150° C. Most solid tackifying resins have a ring and ball softening point from about 70° C. to about 140° C. Solid tackifying resins with a softening point greater than about 100° C., more preferably with a softening point greater than about 130° C., are particularly useful to improve the cohesive strength of the adhesives of the present invention, particularly when only a single homogeneous ethylene/α-olefin interpolymer is utilized.

For the adhesives of the invention, the preferred tackifying resin is predominantly aliphatic. However, tackifying resins with increasing aromatic character are also useful, particularly when a second tackifier or mutually compatible plasticizer is employed.

A plasticizer is broadly defined as a typically organic composition that can be added to thermoplastics, rubbers and other resins to improve extrudability, flexibility, workability or stretchability. In preferred embodiments of the invention, the plasticizer will be provided to the adhesive in amounts from 0 wt-% up to about 50 wt-%, preferably from about 0 wt-% to about 40 wt-% and more preferably in amounts from about 0 wt-% to about 30 wt-% of the adhesive. For most pressure sensitive adhesive compositions, the preferred amount of plasticizer is about 5 wt-%, preferably about 10 wt-% and most preferably from about 15 wt-% to about 30 wt-%. Minor amounts of plasticizer, about 5 wt-% to about 10 wt-%, may be used in non-pressure sensitive adhesive composition to alter the open time and/or reduce the cost of the adhesive composition. The plasticizer may be either a liquid or a solid at ambient temperature. Exemplary liquid plasticizers include hydrocarbon oils, polybutene, liquid tackifying resins and liquid elastomers. Plasticizer oils are primarily hydrocarbon oils which are low in aromatic content and which are paraffinic or naphthenic in character. Plasticizer oils are preferably low in volatility, transparent and have as little color and odor as possible. The use of plasticizers in this invention also contemplates the use of olefin oligomers, low molecular weight polymers, vegetable oils and their derivatives and similar plasticizing liquids.

When a solid plasticizing agent is employed, it will preferably have a softening point above 60° C. It is believed that by combining the homogeneous ethylene/α-olefin interpolymer with a suitable tackifying resin and a solid plasticizer such as a cyclohexane dimethanol dibenzoate plasticizer, the resulting adhesive composition may be applied at temperatures below 120° C., preferably below 100° C. Although a 1,4-cyclohexane dimethanol dibenzoate compound commercially available from Velsicol under the trade name Benzoflex® 352 is exemplified, any solid plasticizer that will subsequently recrystallize in the compounded thermoplastic composition is suitable. Other plasticizers that may be suitable for this purpose are described in EP 0422 108 B1 and EP 0 410 412 B1, both assigned to H.B. Fuller Company.

Waxes may be usefully employed in the adhesive compositions of the present invention, particularly when the adhesive composition is intended to be relatively tack free upon cooling and solidifying, such as for various packaging and bookbinding applications. Waxes are commonly used to modify the viscosity and reduce tack at concentrations up to 60 wt-%, preferably at concentrations ranging from about 5 wt-% to about 55 wt-%, more preferably in amounts ranging from about 10 wt-% to about 35 wt-%, and most preferably from about 15 wt-% to about 30 wt-%.

Waxes useful in the adhesives of the present invention include paraffin waxes, microcrystalline waxes, Fischer-Tropsch waxes, oxidized Fischer-Tropsch waxes, polyethylene and by-products of polyethylene wherein $M_w$ is less than 3000, and functionalized waxes such as hydroxy steramide and fatty amide waxes. The terminology "synthetic high melting point" (HMP) waxes includes high density low molecular weight polyethylene waxes, by product polyethylene waxes, and Fischer-Tropsch waxes. For high melt point waxes, the concentration of wax is typically less than 35 wt-%, whereas at wax concentrations above 35 wt-%, paraffin waxes are typically used and are often used in combination with high melting point waxes in concentrations of less than about 15 wt-% and preferably less than about 10 wt-%.

Also suitable are ultra-low molecular weight ethylene/α-olefin interpolymers prepared using a constrained geometry catalyst, which may be referred to as homogeneous waxes. Such homogeneous waxes, as well as processes for preparing such homogeneous waxes, are set forth in the Examples below. Homogeneous waxes, in contrast to paraffinic waxes and crystalline ethylene homopolymer or interpolymer waxes, will have a $M_w/M_n$ of from 1.5 to 2.5, preferably from 1.8 to 2.2.

Homogeneous waxes will be either ethylene homopolymers or interpolymers of ethylene and a $C_3$–$C_{20}$ α-olefin. The homogeneous wax will have a number average molecular weight less than 6000, preferably less than 5000. Such homogeneous waxes will typically have a number average molecular weight of at least 800, preferably at least 1300.

Depending on the intended end use, the adhesive composition may further comprise at least one additional polymer in combination with the homogeneous ethylene/α-olefin interpolymer and block copolymer at concentrations up to 25 wt-%, preferably at concentrations of less than 10 wt-%. These non-essential additional polymers will be described as "modifying polymers" for the purpose of the present invention. The modifying polymer may be any compatible elastomer, polyamide, amorphous or crystalline polyolefin such as polypropylene, polybutylene or polyethylene wherein $M_w$ is greater than 3000; ethylenic copolymers such as ethylene-vinyl acetate (EVA), ethylene-methyl acrylate (EMA), ethylene(n)-butyl acrylate (EnBA) or a mixture thereof. A preferred modifying polymer for increasing the open time and heat resistance is a polybutene-1 copolymer such as Duraflex® 8910 (Shell).

As is known in the art, various other components can be added to modify the tack, color, odor, etc., of a hot melt adhesive. Additives such as antioxidants (for example, hindered phenolics (for example, Irganox® 1010, Irganox® 1076), phosphites (for example, Irgafos® 168), antiblock additives, pigments, and fillers, can also be included in the formulations. It is generally preferred that the additives should be relatively inert and have negligible effects upon the properties contributed by the homogeneous linear or substantially linear interpolymer, tackifying agent, and plasticizing oil.

Formulations Useful for Hot Melt Adhesives

The following Table A sets forth preferred weight percentages of various components for target end-use applications of the adhesive compositions of the invention.

TABLE A

| | Hot Melt Adhesives | | Pressure Sensitive Adhesives | |
|---|---|---|---|---|
| | Low Temperature | Book-binding | Permanent & Removable | High Performance |
| Homogeneous ethylene/α olefin interpolymer | 5–30 | 5–50 | 5–50 | 10–40 |
| More Preferred | 10–25 | 10–40 | 10–40 | 20–35 |
| Block Copolymer | 1–15 | 2–40 | 2–20 | 5–30 |
| More Preferred | 2–10 | 3–30 | 3–15 | 10–25 |
| Tackifier | 30–60 | 20–60 | 20–60 | 20–60 |
| More Preferred | 35–55 | 25–55 | 25–55 | 30–50 |
| Plasticizing Oil | 0–10 | 0–10 | 0–40 | 0–30 |
| More Preferred | 0–5 | 0–5 | 5–30 | 0–20 |
| Wax | 5–35 | 0–45 | <10 percent | <5 percent |
| More Preferred | 10–30 | 5–35 | <5 | <5 |

The embodied adhesive compositions which are relatively tack-free upon cooling are specifically well suited for various packaging and bookbinding applications. Further, the adhesive composition is useful for bonding a variety of substrates including virgin and recycled Kraft paper, high and low density Kraft, chipboard, coated and treated paper, highly filled paper, laminated paper, etc., as well as polymeric film and foil substrates.

The low temperature applied hot melt adhesive compositions are characterized by Brookfield® viscosities of less than about 5,000 cPs at 135° C., preferably less than about 3,500 cPs, more preferably less than about 2,000 cPs, even more preferably from about 600 cPs to about 1800 cPs, even more preferably from about 700 cPs to about 1600 cPs and most preferably from about 800 cPs to about 1300 cPs at about 135° C. Regardless of the viscosity, the adhesive compositions of the present invention are further characterized by low densities allowing for better adhesion due to better penetration into porous substrates. Low densities also make the compositions ideally suited for recycling.

The low temperature hot melt adhesives of the present invention further exhibit excellent heat resistance, thermal stability and flexibility. The programmed oven peel values or 100 g peels are indicative of the heat resistance. The peel values are typically greater than about 50° C., preferably greater than about 55° C., more preferably greater than about 60° C., even more preferably greater than about 65° C. and most preferably greater than about 70° C.

The set temperature is preferably from about 55° C. to about 80° C., more preferably from about 60° C. to about 75° C. and most preferably from about 60° C. to about 70° C. The open temperature is preferably from about 65° C. to about 95° C., more preferably from about 70° C. to about 85° C. and most preferably from about 70° C. to about 80° C.

The target ranges of properties for bookbinding adhesives is set forth in Table B as follows:

TABLE B

|  | Viscosity at 350° F. | 100 g Peel | Cold Crack | Ambient Range* | Tensile |
|---|---|---|---|---|---|
| Useful | ≦10,000 cps | ≧120° F. (49° C.) | ≦40° F. (4.4° C.) | ≧80° F. (27° C.) | ≧350 psi (2.4 mPa) |
| Good | <8,000 cps | >130° F. (54° C.) | <30° F. (−1° C.) | >100° F. (38° C.) | >500 psi (3.4 mPa) |
| Excellent | <6,000 cps | >140° F. (60° C.) | <20° F. (−7° C.) | >120° F. (49° C.) | >600 psi (4.1 mPa) |

Hot melt pressure sensitive adhesives have different performance criteria depending on the type of application for which the adhesive is being used. There are five general grades including removable, semi-permanent, permanent, freezer and extruder grades.

Removable grade HMPSA's generally have 1800 peels to stainless steel of less than about 3 pounds per linear inch (pli) (540 grams/cm) and loop tack values of less than about 40 ounces (1135 grams). Semi-permanent grades generally have peel values from about 3 to about 5 pounds per inch (about 540 to about 900 g/cm) and permanent grades have peel values of greater than about 5 pli (900 g/cm). Freezer grades HMPSA's may have 180° peels to stainless steel of any value but are often between about 2 and about 4 pli (between about 360 and about 720 g/cm) due to the required softness. The glass transition temperature ($T_g$) is typically less than about −20° F. (about −30° C.). All of these various grades preferably have a viscosity at about 177° C. of less than about 20,000 cPs, preferably less than about 15,000 cPs and most preferably less than about 10,000 cPs. It is generally required that extruder grade HMPSA's have a viscosity at about 177° C. of greater than about 100,000 cPs.

Any of these hot melt pressure sensitive adhesives can be used for a tremendous amount of different applications. Removable grades are used for various tape and label applications including magazine tipping, credit card attachment, removable store shelf marking for sale items, labels for electronics and appliances and so forth. They may also be used for windows in the automobile, recreational vehicle and construction industries. These adhesives further require good ultraviolet (UV) light stability. Semi-permanent grades are used for labels on refrigerated food, i.e., dairy products. Freezer grades are used for frozen food labels and for freezer shelf marking. Permanent grades may be used for mailing labels, bottle labels, case sealing tapes, tamper evident bag closures and so forth. Both permanent and extruder grades may be used for high performance applications such as carpet tape adhesives, "hook and loop" (Velcro®), tapes for the automotive industry, transfer tapes and packaging tapes. Any of these HMPSA's may be used in the bookbinding industry for "tipping" where labels and samples are temporarily adhered to books and magazines, tightbacking, lining-up, book joint and side glue.

The adhesives of the present invention have good specific adhesion to a wide variety of substrates and good internal cohesive strength. When used as removable grade adhesives, the compositions of the present invention have good anchorage to the base substrate to which they are applied in the molten state.

It is desirable that the hot melt pressure sensitive adhesives of the present invention do not fail cohesively. Cohesive failure for removable grades, for instance, leads to adhesive transfer and residue. This is extremely undesirable for compositions usable on disposable articles such as diaper tape adhesives and feminine napkin or incontinent positioning adhesives where residue is transferred to skin or clothing. It is also undesirable for adhesives used on any type of removable label such as for windows, automobiles, appliances, electronics, store shelf-marking, etc.

Cohesive failure refers to the failure of the adhesive internally rather than adhesive failure where the adhesive fails from the substrate. This type of failure tends to leave undesirable residue or adhesive transfer on a substrate unless the adhesive is specifically designed to fail cohesively as found in U.S. Pat. No. 5,741,840 to Lindquist et al. issued Apr. 21, 1998. It has been found that the addition of even small amounts of a block copolymer such as 1% or 2% by weight of the adhesive, will increase the cohesive or internal strength of the hot melt adhesive without detrimentally increasing the viscosity.

Processes for the Preparation of Hot Melt Adhesives.

The hot melt adhesives and pressure sensitive adhesives of the invention may be prepared by standard melt blending procedures. In particular, the first polymer(s), tackifier(s), and optional plasticizer(s) may be melt blended at an elevated temperature (from 150° C. to 200° C.) under an inert gas blanket until a homogeneous mix is obtained. Any mixing method producing a homogeneous blend without degrading the hot melt components is satisfactory, such as through the use of a heated vessel equipped with a stirrer.

Further, the homogeneous ethylene/α-olefin interpolymer(s), optional tackifier(s) and optional plasticizer(s) may be provided to an extrusion coater for application to the substrate.

When the ethylene/α-olefin interpolymer is a blend of two or more ethylene/α-olefin interpolymers, it will be preferred to prepare the pressure sensitive adhesives using a dual reactor configuration, with one of the polymers being produced in the first reactor, the other of the polymers being produced in a second reactor, and the tackifier(s) and optional plasticizer(s) being optionally provided, typically at a point after the second reactor, via a side-arm extruder. In this embodiment, pressure sensitive adhesives can be provided in forms such as pellets, pillows, or any other desired configuration. Examples of such a process which may be adapted in accordance with the teachings of this disclosure to prepare blends of a homogenous linear (higher molecular weight or ultra-low molecular weight) or substantially linear ethylene/α-olefin interpolymer, wax, and optional tackifier, are disclosed in WO 94/00500 and WO 94/01052.

The hot melt adhesives of the present invention can be applied by extrusion, slot coating, spiral spray, meltblown, spray-splatter, screen printing, or roll coating by delivery from bulk or reservoirs capable of controlling the temperature within a range from about 121° C. (250° F.) to about 204° C. (400° F.).

Test Methods

Unless indicated otherwise, the following testing procedures are employed:

Density is measured in accordance with ASTM D-792. The samples are annealed at ambient conditions for 24 hours before the measurement is taken.

Melt index ($I_2$), is measured in accordance with ASTM D-1238, condition 190° C./2.16 kg (formally known as "Condition (E)").

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min. and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968, incorporated herein by reference) to derive the following equation:

$$M_{polyethylene} = a^*(M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the ith fraction eluting from the GPC column.

Fineline & Spray

Adjust the hot melt applicator and laminator to proper setting.

| | |
|---|---|
| Nip Pressure | 15 psi (0.1 mpa) |
| Spiral Spray | 4 mg/in² (26 mg/cm²) |
| Fineline | 1.4 mg/in (3.6 mg/cm) |
| Web Speed | 400–500 ft/min (120–150 meters/min) |
| Air Temp. | 50° F. (10° C.) above application temp |
| Nozzle Distance from Substrate | 30–60 mm |

Prepare fineline and spray bonds using the settings indicated above. During the run, drop eight to ten 2 inch by 8 inch (5 cm by 20 cm) strips of release paper cross directional across the web to serve as starting points for the T-peel evaluation. Cut 10 samples one bead or one spray spiral in width by 3 inches (7.6 cm) in length. Run T-peels on a slip/peel tester, Instron or other suitable measuring device at 12 inches (30 cm) per minute. Report the average of 10 samples.

Set Temperature and Open Temperature

The gradient bar method was used to determine open/waxy and waxy/set temperatures. The gradient bar is set and equilibrated for 1 hour. A molten line of adhesive which is approximately ¼ inch wide (0.6 cm) was poured down the center of the gradient bar. A strip of Kraft paper which is approximately 2 inches by 14 inches (5 cm×35.6 cm) was placed on top of the adhesive line and a 4.5 pound PSA roller was passed over the top of the Kraft paper twice in order to assure that the system is sufficiently wet out. This laminate is then allowed to dwell for 3 minutes at which time the Kraft paper is peeled starting from the hottest end of the gradient bar and pulling slowly to the coolest end. Transition temperatures are determined using a digital thermometer (pyrometer) which has a surface probe. Temperatures are recorded on the metal surface of the gradient bar.

The set/waxy temperature is the point at which the tear line for the paper crosses the entire adhesive line. Once the set temperature has been determined, the open/waxy temperature may be determined. After the 2 inch by 14 inch (5 cm×35.6 cm) of Kraft paper has been torn from the adhesive line, ⅛ inch to ¼ inch by 2 inch strips of paper (0.3 cm to 0.6 cm×5 cm) were placed down on the gradient bar over the open/waxy region. The paper strips were then removed from the low temperature end until a piece with adhesive wetting out the paper was found, designating the open/waxy transition temperature.

Programmed Oven Peels (100g) and Programmed Oven Shears (500g)

Each adhesive sample was coated onto Kraft paper by hand using glass rods or shims. The resultant coating is a 1 inch (2.5 cm) wide band that is about 8–10 mils or 0.008 to 0.010 inches (0.2 to 0.25 mm) thick. After conditioning the bonds at room temperature for at least 16 hours, the peel values and shear values were determined by placing samples in a programmed oven with 100 gram weights for the peel mode and 500 gram weights for the shear mode, ramping the temperature up from 25° C. to 175° C. at a rate of 25° C./hour. The oven automatically records the temperature at which the samples fail. The reported result is the average failure temperature of four to five bonds.

180° Peels to Stainless Steel

Peel values were determined using test method #PSTC-1. About 1 mil adhesive film is coated onto polyester (Mylar®) film out of a solvent blend using a Baker Applicator. Samples are then cut into 1 inch×8 inch strips (2.54 cm×20.32 cm) for determining peel values.

Loop Tack, Quick Tack or Quick Stick

A film of adhesive about 1 mil thick is coated onto polyester (Mylar®) film out of a solvent solution. The film is allowed to dry for a minimum of 24 hours. The film is then mated with release liner, and cut into 1 inch×5 inch strips (2.54 cm×12.7 cm). A test sample is then inserted into a Chemsultants International Loop Tack Tester with the adhesive side facing out (release liner removed). The Loop Tack Tester automatically records the tack value in oz/in².

Shear Adhesion Failure Temperature (SAFT)

The adhesive composition is solvent coated onto Mylar® polyester manufactured by the Du Pont de Nemours in Wilmington, DE at a coat weight of about 25 g/m². The solvent is allowed to evaporate. The sample is cut into 1 inch×3 inch (2.54 cm×7.62 cm) strips and two coated strips are laminated together overlapping a 1 inch×1 inch (2.54 cm×2.54 cm) area being careful not to entrap air bubbles. The remaining coated strip of adhesive may be covered with release liner. A 500 gram weight is then suspended to one end of the resultant laminate which is then suspended from the ceiling by clamps in a programmable forced air oven. The oven temperature is ramped at a rate of 25° C. per hour and the temperature at which the specimen fails is recorded. This measurement is used as an indication of the heat resistance of the composition which is important for shipping.

Bonding Tests

Adhesive bonds were made on various substrates using an application temperature of about 135° C., an open time of 2 seconds, a set time of 2 seconds, and a bead size of 3/32 of an inch (0.32 cm) on corrugated substrates. The resulting bonds were then conditioned for at least 24 hours at the different test temperatures, and then separated by hand and the amount of fiber tear was determined. A minimum of three samples were tested for each adhesive at each of the different temperatures and the adhesives were then rated using a system of poor, good or excellent. Poor bonds were those where a small amount or no fiber tear was observed, good bonds showed roughly half or more fiber tear and excellent bonds showed a substantial amount of fiber tear or close to full fiber tear.

Cloud Point

A 25 mm×150 mm Pyrex test tube is filled 3/4 full with molten hot melt adhesive at a temperature of about 177° C. A thermometer is inserted into the molten hot melt resting against the test tube wall. The "cloud point" is the temperature at which the thermometer markings are no longer visible when observed through the test tube wall opposite the thermometer.

Ambient Range is defined as the difference between the 100 g peel and the cold crack.

Ultimate Tensile & Elongation, Yield Point and Young's Modulus

Tensile and elongation, Young's Modulus and Yield Point are determined using ASTM D-638. The die used is an ASTM D-638 Type 4 die. A one inch gauge with a video extensometer is used to monitor elongation. Strain rate is between about 20 inches/minute and about 25 inches/minute (20.5 inches/minute for these examples). Prepare a 20–30 mil (0.5–0.7 mm) thick adhesive film free of air bubbles on a polytetrafluoroethylene or aluminum sheet. Cut 7 dogbones lengthwise from the film measuring the thickness at the gauge section. Condition the samples for at least 24 hours at 21° C. and 23 to 50 percent relative humidity. Place each sample in the jaws of an Instron tensile tester or equivalent with a load cell capable of measuring up to about 2000–2500 psi. Elongate samples at a 10 inches/minute (20.5 cm/min) crosshead speed until break. Record the Ultimate Tensile strength at break by dividing the maximum force by the initial cross-sectional area of the sample and "percent Elongation" by dividing the displacement at break by the sample length and multiply by 100. These are averages of at least five samples. Yield point or yield stress is the point on the stress versus strain curve where the stress value becomes constant with strain and where an irreversible deformation has occurred. The resistance to tensile deformation or Young's Modulus, is generally measured at small strains. Young's modulus is a method of ranking the relative flexibility of adhesive films.

Cold Crack

Prepare several 1 inch by 3 inch (2.5 cm by 7.6 cm) adhesive films free of air bubbles which are 20–30 mils (0.5–0.7 mm) in thickness. Place three films individually over the v-shaped base of a cold crack apparatus which consists of a stand with an interlocking pressure bar. The stand is 3 inches (7.6 cm) by 0.75 inch (1.9 cm) wide and 12 inches (30 cm) long. A 90° angle is cut squarely 1/2 inch (1.3 cm) deep into the top surface. Place the pressure bar, which is also cut at a 90° angle, into the gap of the stand. This test is repeated lowering the temperature at 5° F. (−15° C.) increments with a new film sample for each temperature until the film cracks. The recorded "Cold Crack" is an average of at least 2 samples.

Melt Viscosity

Melt viscosity is determined in accordance with the following procedure using a Brookfield Laboratories DVII+ Viscometer in disposable aluminum sample chambers. The spindle used is a SC-31 hot-melt spindle, suitable for measuring viscosities in the range of from 10 to 100,000 centipoise. A cutting blade is employed to cut samples into pieces small enough to fit into the 1 inch (2.5 cm) wide and 5 inches (13 cm) long sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to 350° F. (177° C.), with additional sample being added until the melted sample is about 1 inch (2.5 cm) below the top of the sample chamber. The viscometer apparatus is lowered and the spindle submerged into the sample chamber.

Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, which final reading is recorded.

EXAMPLES:

Description of Ingredients Employed in the Examples

| | |
|---|---|
| Polymer A | 500 MI, 0.870 g/cm³ ethylene-octene homogenous interpolymer (The Dow Chemical Company, Freeport, TX) |
| Polymer B | 1000 MI, 0.870 g/cm³ ethylene-octene homogenous interpolymer (The Dow Chemical Company, Freeport, TX) |
| Polymer C | 5 MI, 0,870 g/cm³ ethylene-octene homogeneous interpolymer (The Dow Chemical Co.) |
| Polymer D | 20% styrene, 100% triblock, 10 MI, S-EB-S block copolymer |
| Polymer E | 30% styrene, 30% diblock, MFR = 14, S-EB-S block copolymer |
| Kraton ® G-1650 | 29% styrene, 100% triblock S-EB-S block copolymer Solution Viscosity = 8,000 cPs @ 25 wt-% polymer at 25° C. (Shell, Houston, TX) |
| Kraton ® G-1651 | 33% styrene, 100% triblock S-EB-S block copolymer Solution Viscosity = 1,850 cPs @ 10 wt-% polymer at 25° C. |

-continued

| | |
|---|---|
| Kraton ® G-1652 | 29% styrene, 100% triblock S-EB-S block copolymer Solution Viscosity = 1,350 cPs @ 25 wt-% polymer at 25° C. (Shell, Houston, TX) |
| Kraton ® G-1657 | 13% styrene, 35% diblock S-EB-S block copolymer Solution Viscosity = 4,200 cPs @ 25 wt-% polymer at 25° C. (Shell, Houston, TX) |
| GRP-6917 | styrene-ethylene/butylene-styrene with short chain branching due to a high vinyl content and having greater than about 32 wt-% styrene, Solution Viscosity = 70 cPs @ 10 wt-% polymer at 25° C., 8200 cPs @ 20 wt-%. |
| GRP-6918 | styrene-ethylene/propylene-styrene block copolymer similar to Kraton ® G-1651, Solution Viscosity = 1400 @ 10 wt-%. |
| Kraton ® G-1730 | styrene-ethylene/propylene-styrene-ethylene/propylene block copolymer having terminal ethylene/propylene block |
| Kraton ® G-1780 | styrene-ethylene/propylene star block copolymer having styrene content of ~7 wt-%, Solution Viscosity = 410 cps @ 10 wt-% |
| N500 Oil | naphthenic processing oil |
| Escorez ® 5615 | aliphatic-aromatic hydrocarbon resin |
| Escorez ® 5400 | 100° C. hydrogenated dicyclopentadiene hydrocarbon resin (Exxon, Houston, TX) |
| Escorez ® 5340 | 140° C. hydrogenated dicyclopentadiene hydrocarbon resin (Exxon, Houston, TX) |
| ECR-158 | High Tg hydrogenated dicyclopentadiene hydrocarbon resin (Exxon, Houston, TX) |
| Hercules ® V-1120 | aliphatic-aromatic hydrocarbon resin |
| PX100 Wax | Synthetic Fischer-Tropsch wax; 100° C. melt point |
| Paraflint ® C-80 | synthetic low melting point (80° C.) wax; Fischer-Tropsch |
| Regalite V-1120 | 120° C. hydrogenated hydrocarbon resin, (Hercules, Wilmington, DE) |
| Irganox ® 1076 | hindered phenolic antioxidant |

Polymers A and B are ethylene/1-octene copolymers prepared in a continuous solution polymerization process in accordance with U.S. Pat. No. 5,272,236, U.S. Pat. No. 5,278,272 and U.S. Ser. No. 08/784,683, filed on Jan. 22, 1997 in the names of Finlayson et al., each of which is incorporated herein by reference in its entirety. Polymers A and B were treated with 35 ppm water as a catalyst kill, and were stabilized with 2000 ppm Irganox® 1076 hindered phenolic antioxidant.

Pressure Sensitive Adhesive Examples

An experimental design was conducted in order to study the effect of adding homogeneous interpolymers to a styrene-ethylene/butylene-styrene based hot melt PSA. The concentration range for each ingredient employed in the design is as follows, whereas the measured responses were Loop Tack, SAFT and 180° Peel:

| Ingredient Tradename | Concentration Range (wt %) |
|---|---|
| Escorez ® 5400 | 50 (constant) |
| Polymer B | 0 to 20 |
| Kraton ® G-1652 | 10 to 25 |
| 500 second processing oil | 15 to 30 |

RS/1 experimental design software generated an eleven sample design, which included 4 replicates. A 300 gram amount of each example was made as a hot melt in a Caframo mixer and dissolved in toluene. PSA films on Mylar™ were made by casting from solvent. RS/1 was used to generate models for the three responses. Loop Tack did not model well and no conclusions could be drawn from the data. Models for SAFT and 180° Peel exhibited no statistical evidence of lack of fit.

Figure 2:
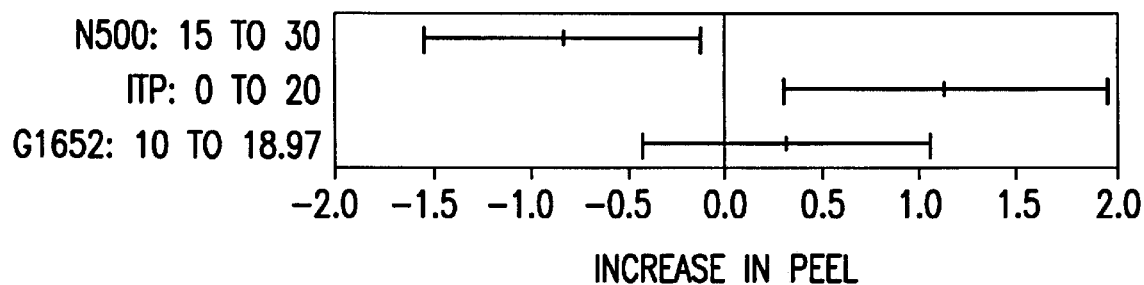
Figure 3:
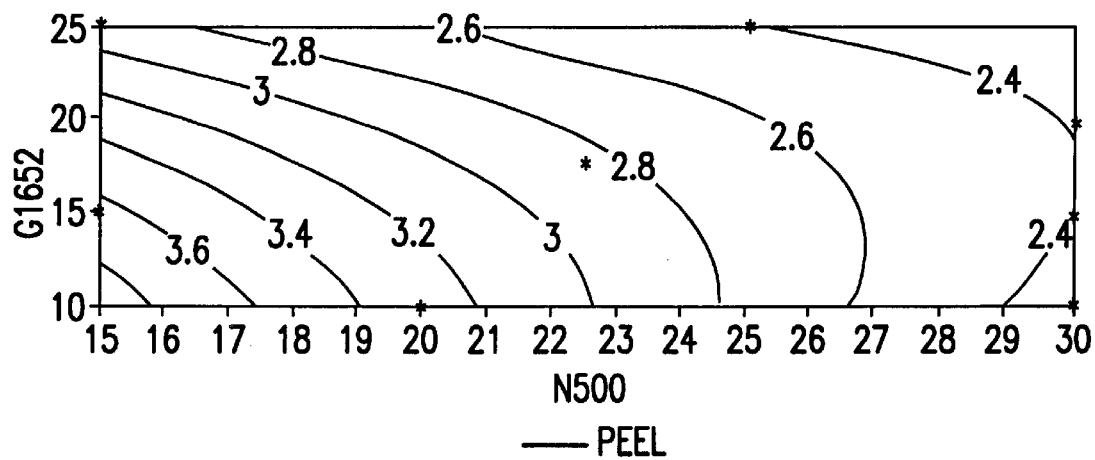
Figure 4:
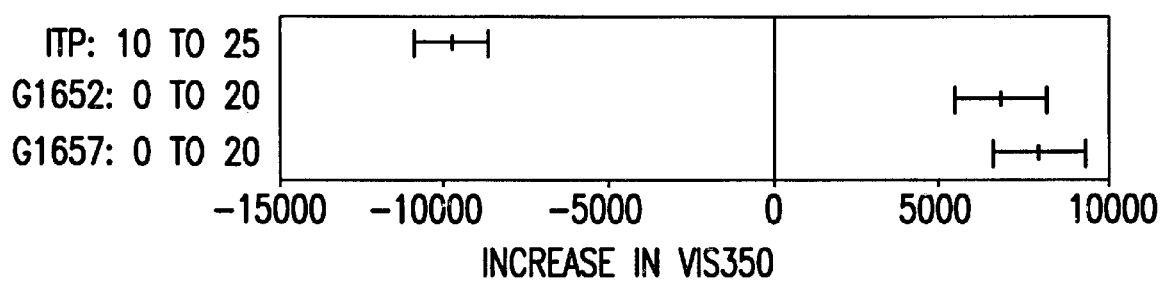
Figure 5:
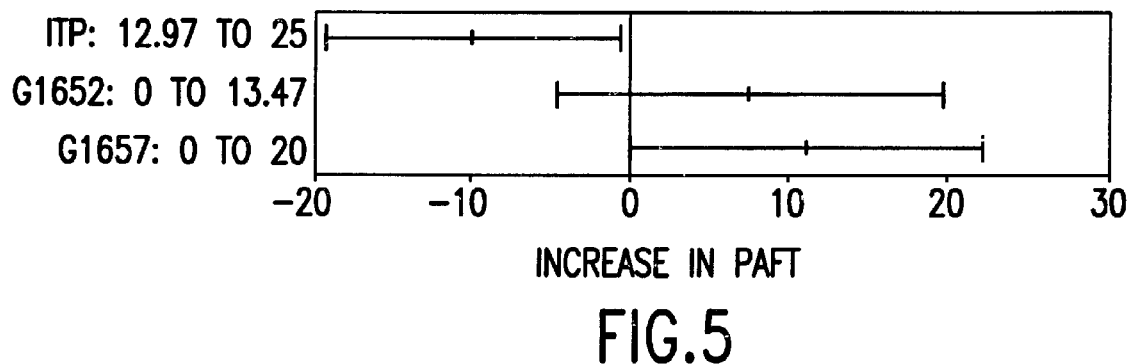
Figure 6:
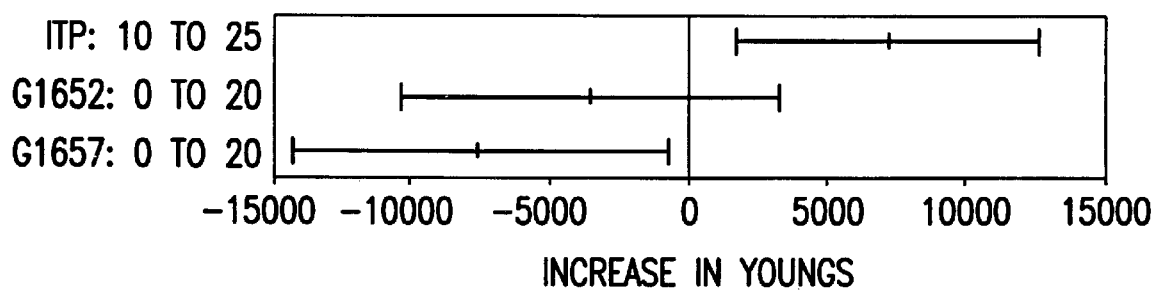
Figure 7:
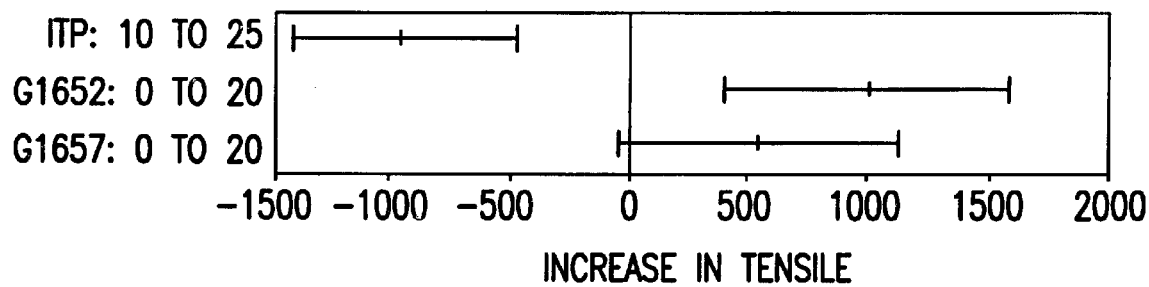
Figure 8:
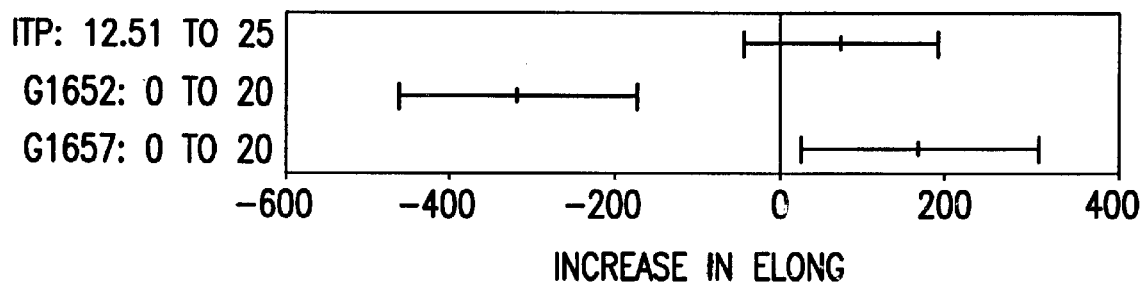

The results of the SAFT and 180° Peel models show some interesting effects. Effects diagrams depict the change in a response with respect to a change in the concentration of an ingredient from the minimum to the maximum of the range while the other ingredients are held constant. The "constant" amounts, called the reference mixture, are the average formulation in the design. Accordingly, FIG. 1 demonstrates that as the block copolymer concentration increases from 10 to 25, a 40° F. (~4° C.) increase in SAFT is obtained. Whereas, both the homogeneous interpolymer (ITP) and the oil (N500) have a decreasing effect on SAFT. The effect of the oil's decrease on SAFT is about twice as great as homogeneous interpolymer. FIG. 2 depicts that an increase in block copolymer has little effect on peel, whereas increasing oil decreases peel. The Applicants surmised that the homogeneous interpolymer would act like an oil in the adhesive. This expectation was confirmed with respect to SAFT. However, unlike an oil, the peel adhesion increased with increasing ITP polymer. FIG. 3 is a contour plot of Peel depicting that at a constant resin concentration maximum peel values are achieved with a maximum homogeneous interpolymer concentration. Reducing the oil content of products without decreasing tack minimizes oil bleed through and staining problems. This property is particularly desirable for tapes and labels which are bonded to paper substrates as well as feminine care positions adhesives, as a means to reduce residual transfer and cost.

Experimental Formulas and Test Data

The following examples illustrate compositions of the design and of the present invention:

| Example | Escorez® 5400 | N500 Oil | Polymer B | Kraton® G1652 | Loop Tack | SAFT °F. | 180° Peel |
|---|---|---|---|---|---|---|---|
| 1 | 50 | 15 | 20 | 15 | 65.2 (1.85 kg) | 145 (63° C.) | 3.6 |
| 2 | 50 | 15 | 10 | 25 | 55.7 (1.58 kg) | 163 (73° C.) | 2.7 |
| 3 | 50 | 15 | 10 | 25 | 56 (1.59 kg) | 161 (72° C.) | 3.2 |
| 4 | 50 | 30 | 10 | 10 | 93.3 (2.65 kg) | 118 (48° C.) | 2.1 |

A series of experiments were conducted to examine the compatibility of high molecular weight substantially hydrogenated block copolymers, namely S-EB-S and S-EP-S, with homogeneous interpolymers. The base formulation is as follows:

| Ingredients | Concentrations |
|---|---|
| Polymer B | 20 |
| Block Copolymer | 10 |
| Escorez® 5400 tackifier resin | 50 |
| Pennznap® 500 oil | 20 |

| Example | Block Copolymer Type | SAFT °F. | 180° peel | Loop Tack | Appearance |
|---|---|---|---|---|---|
| 5 | Kraton® G-1652 | 133 (56° C.) | 4.0 #/in (715 g/cm) adhesive-ss | 65 oz. (1.84 kg) | clear film |
| 6 | GRP-6917 | 150 (66° C.) | 5.1 #/in (912 g/cm) 50% cohesive | 93 oz. (2.64 kg) | clear film |
| 7 | GRP-6918 | 159 (71° C.) | 6.0 #/in (1072 g/cm) adhesive-mylar | 103 oz. (2.92 kg) | clear film |
| 8 | Kraton® G-1651 | 172 (78° C.) | 5.5 #/in (983 g/cm) adhesive-ss | 111 oz. (3.15 kg) | clear film |

All hydrogenated styrene block copolymer structures tested formed compatible pressure sensitive adhesive compositions. No component separation occurred in the molten adhesive nor the coated films. The high molecular weight block copolymer based adhesive exhibited the best pressure sensitive adhesive performance. Additional formulations were made employing higher concentrations of block copolymer in an attempt to maximize the heat resistance and peel adhesion. The base composition was as follows:

| Ingredients | Concentration |
|---|---|
| Polymer B | 15 |
| Block Copolymer | 20 |
| Escorez® 5400 tackifier resin | 55 |
| Pennznap® 500 oil | 10 |

| Example | Block Copolymer Tradename | SAFT | 180° peel | Loop Tack | Appearance |
|---|---|---|---|---|---|
| 9 | Kraton® G-1652 | 160° F. (71° C.) | 5.3 #/inch (983 g/cm) | 72 oz. (2.04 kg) | Clear film |
| 10 | Kraton® G-1650 | 164° F. (73° C.) | 5.0 #/inch (894 g/cm) | 71 oz. (2.01 kg) | Clear film |
| 11 | Kraton® G-1657 | 143° F. (62° C.) | 5.2 #/inch (929 g/cm) | 80 oz. (2.27 kg) | Clear film |
| 12 | Kraton® G-1730 | 152° F. (67° C.) | 7.0 #/in zip (1251 g/cm) | 85 oz. (2.41 kg) | Clear film |
| 13 | GRP-6917 | 192° F. (89° C.) | 6.8 #/inch (1215 g/cm) | 92 oz. (2.61 kg) | Clear film |

Examples 9 to 13 all remained clear in both molten and in film form. The slightly higher molecular weight, Kraton® G-1650, did not appear to offer any significant performance advantages over Kraton® G-1652. Further, the low styrene content of Kraton® G-1657 is surmised not to provide equivalent network strength within the adhesive resulting in lower heat resistance. This "softer adhesive" did not show a significant improvement in Loop Tack. Example 12, comprising S-EP-S-EP exhibited zipper-like failure in the 180° degree peel test and thus, is surmised to have a Tg to close to room temperature. By employing GRP-6917, a high vinyl, high molecular weight S-EB-S block copolymer, a substantial improvement in heat resistance and Loop Tack was obtained in combination with a reduced viscosity.

Example 14 illustrates compositions which may be used for disposable article construction:

| Example 14 | |
|---|---|
| Polymer C (5 MI/0.87 density) | 10.5 |
| Kraton® G-1780 | 2.5 |
| Escorez® 5400 | 58 |
| 500 sec process oil | 28 |
| Irganox® 1010 | 1 |
| Visc. @ 275° F. (135° C.) | 4310 |
| Visc. @ 300° F. (149° C.) | 2540 |
| Spiral Spray T-peels average | 118 |
| Spiral Spray T-peels aged (2 weeks @ 49° C.) | 270 |
| Spiral Spray T-peels aged (5 weeks @ 49° C.) | 301 |
| Fine line T-peels (fl) Average | 105 |
| Fine line T-peels aged (2 weeks @ 49° C.) | 128 |
| Fine Line T-peels aged (5 weeks @ 49° C.) | 151 |

Adding a small amount of block copolymer improved the cohesive strength without substantially increasing the viscosity.

Low Application Temperature Hot Melt Adhesive

A second experimental design was conducted with the ingredients and concentration ranges as follows:

| Ingredients | Concentration Range (wt-%) |
|---|---|
| Bareco ® PX 100 Wax | 20 (constant) |
| Paraflint ® C-80 Wax | 5 (constant) |
| Escorez ® 5400 | 44 to 55 |
| Polymer B (ITP) | 20 to 30 |
| Kraton ® G-1652 | 0 to 4 |
| Kraton ® G-1657 | 0 to 4 |

EXAMPLES 15–21

The total amount of polymer was constrained to a range of 25 wt-% to 31 wt-%. The measured responses were viscosity at 275° F. (135° C.), programmed oven peel and shear, open time, set time and cloud point. RS/1 computer software was used to generate a 15 experiment, 2 replicate D-optimal quadratic model design. The examples were compounded with a Caframo mixer, 300 grams each.

The following examples were selected to illustrate the compositions of the present invention (open temp and set temp are both shown in ° F.):

| ITP | E5400 | G1657 | G1652 | Open Tem | Set Tem | Cloud pt | PAFT | SAFT | V275F |
|---|---|---|---|---|---|---|---|---|---|
| 23 | 44 | 4 | 4 | 172 | 139 | 268 | 138 | 181 | 2820 |
| 21 | 50 | 0 | 4 | 173 | 142 | 256 | 140 | 181 | 1086 |
| 21 | 50 | 4 | 0 | 169 | 132 | 202 | 142 | 148 | 1320 |
| 24.5 | 46.83 | 1.83 | 1.84 | 163 | 140 | 216 | 141 | 176 | 1285 |
| 20 | 50 | 2.5 | 2.5 | 169 | 143 | 214 | 145 | 175 | 1283 |
| 25 | 50 | 0 | 0 | 179 | 136 | 204 | 116 | 148 | 695 |
| 30 | 44 | 1 | 0 | 172 | 142 | 208 | 134 | 186 | 1191 |

RS/1 was used to fit a model for each response using stepwise regression and no data was discarded as outlying. All responses were modeled with raw data with the exception of viscosity and cloud point. These two responses gave statistically better model fits with transformed data. An inverse square root transform was used for the viscosity response and inverse transformation for the cloud point. Since both transforms are using the inverse of the original data, the effects are also inversed and thus opposite. As peel decreases the inverse peel increases. The following effects were discovered:

| Ingredient | Polymer B | Escorez ® 5400 | Kraton ® G1657 | Kraton ® G1652 |
|---|---|---|---|---|
| 100 g Peel | −1.4 | −3.17 | 11 | 11.19 |
| 500 g Shear | 25.66 | −18.22 | 5.96 | 16.78 |
| Set Temp | 8.82 | −6.76 | 2.33 | 9.06 |
| Open Temp | 10.06 | 4.1 | −4.12 | −4.74 |
| Visc @ 135° C. | −0.006 | −0.0063 | −0.104 | −0.008 |
| Cloud Point | −0.00017 | 0.00021 | 0.00026 | −0.00089 |

Reference Mixture: (24.52:46.69: 1.84: 1.93)(ITP: E5400: G1657: G1652)

Interestingly, the incorporation of either block copolymer increases the programmed oven peel and decreases the open temperature to about the same extent. The set temperature and programmed oven shear is increased substantially with the addition of the higher styrene content, 100% triblock block copolymer while the 35 wt-% diblock block copolymer contributes only a slight increase. Further, the addition of Kraton® G1652 increases the cloud point, indicative of poorer compatibility. Two optimized formulations, one containing a combination of block copolymers, Example 23, and the other containing a single block copolymer, Example 22, are depicted as follows:

The following compositions exhibited an excellent balance of superior properties:

| | Example 22 | Example 23 | Example 24 |
|---|---|---|---|
| Ingredients | | | |
| Polymer B | 20.5 | 20 | 12 |
| Escorez ® 5400 | 49.7 | 49.7 | 52.5 |
| Kraton ® G1657 | 4.5 | 2.2 | |
| Kraton ® G1652 | — | 2.8 | 14 |
| Bareco ® PX-100 | 20 | 20 | 21 |
| Paraflint ® C-80 | 5 | 5 | |
| Irganox ® 1010 | 0.3 | 0.3 | 0.5 |
| Physical Properties | | | |
| Viscosity (cPs) at 250° F. (121° C.) | 2320 | 2156 | 8000 |
| Viscosity (cPs) at 275° F. (135° C.) | 1386 | 1285 | 3275 |
| Viscosity (cPs) at 300° F. (149° C.) | 890 | 886 | 1700 |
| Set Temperature ° F. (° C.) | 142° F. (61° C.) | 141 ° F. (61° C.) | |
| Open Temp ° F. (° C.) | 167° F. (75° C.) | 167° F. (75° C.) | |
| Cloud Point ° F. (° C.) | 201° F. (94° C.) | 219° F. (104° C.) | |

-continued

|  | Example 22 | Example 23 | Example 24 |
|---|---|---|---|
| Gardner Color | 1 | 1 | 1 |
| 100 g Peel ° F. (° C.) | 135° F. (57° C.) | 141° F. (61° C.) | 157° F. (69° C.) |
| 500 g Shear ° F. (° C.) | 159° F. (71° C.) | 177° F. (81° C.) | 179° F. (82° C.) |

A thermal stability was conducted on Examples 22 and 23 at 135° C. After 200 hours of heat history the change in viscosity was 5% or less and an increase in color of 2–3 Garner units was noted. Example 23 was hazy yet no gel or phasing was present at 200 hours.

Bond Testing

All bonds were prepared on Inland board stock via the Waldorf.

| | % Fiber Tear | | |
|---|---|---|---|
| Temperature | 0° F. (~−18° C.) | 40° F. (~4.5° C.) | RT (25° C.) |
| Example 22 | no fiber tear | Good | excellent |
| Example 23 | no fiber tear | Good | excellent |

Bookbinding Adhesive Compositions

A third experimental design was conducted with the ingredients and concentration ranges as follows:

| Ingredients | Concentration Range (wt-%) |
|---|---|
| Bareco ® PX 100 Wax | 25 (constant) |
| Escorez ® 5615 | 35 (constant) |
| Polymer B | 10 to 25 |
| Kraton ® G 1652 | 0 to 20 |
| Kraton ® G 1657 | 0 to 20 |

The sum of polymer was constrained to 30 wt-% to 40 wt-%. The measured responses were viscosity at 177° C. (350° F.), programmed oven peel (100 g), Young's Modulus, ultimate tensile, elongation at break, storage modulus and DMA crossover temperatures. RS/1 was used to generate an 11 experiment design, which included 3 replicates. The sample size was 300 g and each sample was made on a Caframo upright mixer. Samples made with Kraton® G-1652 appeared much less compatible than those made with Kraton® G-1657. It was surmised that this could be attributed to the higher styrene content. RS/1 was used to fit a model for each of the responses.

In general, this design yielded a series of products with very high tensile strengths and heat resistance while maintaining low viscosity. For example, the minimum viscosity predicted by the model is 2,630 cPs at 177° C. Even at this low of viscosity, the model predicts an ultimate tensile of 708 psi (50 kg/cm$^2$), an elongation at break of 607%, and a 100 g oven peel value of 72° C. (162° F.). The cold crack is assumed to be about 10° F. (~−12° C.). At a viscosity of 5000 cPs at 176.7° C., the tensile climbs to 1154 psi (81 kg/cm$^2$). The highest possible tensile predicted is 1620 psi or 114 kg/cm$^2$ (visc=12,224 cPs), and the highest possible peel is 80° C. (visc=10,540 cPs). The lowest predicted peel value with any product in the design is 71.6° C. (161° F.). Even this is much higher than typical EVA based hot melt bookbinding adhesives.

The effects diagrams depicted in FIGS. 4 to 8 form the basis of the following conclusions. Kraton® G-1657 increases viscosity more than Kraton® G-1652, although not by much. Increasing the block copolymer concentration at the expense of homogeneous ethylene/α-olefin interpolymer (ITP) increases the peel values, the G-1657 having a slightly greater effect than the G-1652. Further, adding ITP at the expense of block copolymer increases Young's Modulus. Kraton® G-1652 has a significantly greater effect than Kraton® G-1657 in increasing tensile strength. Adding Kraton® G-1657 increases elongation at break, while adding Kraton® G-1652 decreases elongation. This is probably due to the lower compatibility of G-1652. These results suggest that lower styrene content block copolymer is preferred. The higher styrene content block copolymer contributes higher tensile strengths, yet is marginally compatible. However, the tensile strength of the Kraton® G1657 containing products is surmised to be sufficient.

EXAMPLES 25–31

The following bookbinding formulations illustrate the compositions of the present invention and are found within the design range specified above.

| Example | PX100 | E5615 | Polymer B | G1652 | G1657 |
|---|---|---|---|---|---|
| 25 | 25 | 35 | 20.0 | 20.0 | 0.0 |
| 26 | 25 | 35 | 25.0 | 0.0 | 15.0 |
| 27 | 25 | 35 | 10.0 | 10.0 | 20.0 |
| 28 | 25 | 35 | 10.0 | 20.0 | 10.0 |
| 29 | 25 | 35 | 25.0 | 7.5 | 7.5 |
| 30 | 25 | 35 | 25.0 | 15.0 | 0.0 |
| 31 | 25 | 35 | 18.3 | 10.8 | 10.8 |

-continued

| Example | Viscosity at 350° F. (177° C.) | 100 g Peels ° F. (° C.) | Storage Modulus G' | Crossover Temp. (° C.) | Young's Modulus (psi) | Ultimate Tensile (psi) | Elongation at Break (%) |
|---|---|---|---|---|---|---|---|
| 25 | 5734 | 167 (75) | 6.70E+08 | 100 | 13290<br>935 kg/cm$^2$ | 1354<br>95 kg/cm$^2$ | 493 |
| 26 | 3450 | 161 (72) | 4.70E+08 | 91 | 10506<br>739 kg/cm$^2$ | 516<br>36 kg/cm$^2$ | 873 |
| 27 | 12950 | 175 (79) | 5.50E+08 | 90 | 6625<br>466 kg/cm$^2$ | 1838<br>129 kg/cm$^2$ | 673 |
| 28 | 11750 | 173 (78) | 6.30E+08 | 96 | 9423<br>663 kg/cm$^2$ | 1623<br>114 kg/cm$^2$ | 535 |
| 29 | 2843 | 161 (72) | 6.20E+08 | 91 | 15878<br>1118 kg/cm$^2$ | 791<br>56 kg/cm$^2$ | 660 |
| 30 | 2515 | 165 (74) | 5.10E+08 | 89 | 15954<br>1123 g/cm$^2$ | 698<br>49 g/cm$^2$ | 446 |
| 31 | 5760 | 168 (76) | 8.80E+08 | 90 | 11687<br>823 g/cm$^2$ | 1061<br>75 kg/cm$^2$ | 578 |

Following are two exemplary bookbinding adhesive compositions:

| Ingredients | Example 32 | Example 33 |
|---|---|---|
| Polymer B (1000 MI/0.87) | 20.0 | 20.0 |
| Kraton ® G-1657 | 20.0 | 15.0 |
| Hercules ® V-1120 | 34.5 | 24.5 |
| Escorez ® 5400 | 20.0 | 30.0 |
| HMP Wax | 25.0 | 20.0 |
| Irganox 1076 | 0.5 | 0.5 |
| Visc. @ 350° F. (~177° C.) | 5,775 cPs | 3,415 cPs |
| 100 g Peels ° F. (° C.) | 156 (~69) | 150 (~66) |
| Cold Crack ° F. (° C.) | 10 (~−12) | 15 (~−9) |
| Ambient Range (100 g peel-cold crack) | 146° F. (~63° C.) | 135° F. (~57° C.) |
| Ultimate Tensile (psi) | 800 (56 kg/cm$^2$) | 730 (51 kg/cm$^2$) |
| Yield Point (psi) | 354 (25 kg/cm$^2$) | 360 (25 kg/cm$^2$) |
| Elongation @ Break (%) | 1,570 | 780 |

Although the viscosity of these products is not unusually low (as compared to conventional technology), the viscosity is acceptable. The ambient range of these products is quite broad as compared to conventional one shot bookbinding hot melts which range from about 100° F. to about 120° F. (about 38° C. to about 49° C.) for exceptional systems. Rubber based hot melt adhesives may have similar ambient ranges but are seldom used as one shot products and lack thermal stability as compared to the examples shown above. A combination of all these properties has not been achieved with previous bookbinding adhesive compositions.

Additionally, the compositions can be modified in ambient range either higher or lower to promote characteristics which may be desirable in extreme conditions of heat and cold. By employing higher melt point tackifiers, additional heat resistance in 100 g peel can be obtained. By contrast, lower melt point waxes and tackifying resins can be employed to promote exceptional low temperature performance. Also, adhesive compositions can be formulated which have a slower rate of set and lower viscosity than the depicted examples for use at lower application temperatures. While it is common to apply one shot bookbinding hot melts at 330° F.–375° F. (~166° C.–191° C.), lower application temperatures in the 225° F.–300° F. (~107° C.–149°) are contemplated within the scope of this technology.

These bookbinding adhesives are useful for one-shot or perfect binding, two-shot bookbinding, casemaking and casing-in. One-shot or perfect binding is a process by which the cover of the book is attached to the spine of the book block through the use of one adhesive which is applied to the spine. The book block is formed from signatures which are subsequently formed from the sheets of the book. A signature is made up of many sheets whereas the book block is made up of many signatures. Two-shot bookbinding first involves the application of a primer to the spine of the book block and then secondly, the adhesive which forms the bond to the cover is applied. There are also alternate types of applications including one called Rep-Kover in which a soft cover book is bound. The adhesive is applied to the cover and the cover is then bonded to the book block along the sides of the spine rather than on the spine itself. A piece of crepe may be bonded to the spine but the cover itself remains free of the spine. This is generally used for soft cover books. Each of these methods requires a fast-setting adhesive which generally has a higher wt-% of wax such as those found in the examples above.

Casing-in is the process by which the case or cover of the book is attached to the book end sheets. The end sheets are those outer pages of the book block. Case-making is the process by which the case of the book is made. Both of these processes require slower setting adhesives having a lesser wt-% of wax.

EXAMPLE 32

This example illustrates a third preferred composition useful for bookbinding. A sample was prepared by blending a sample of 20% by weight of an interpolymer of ethylene/1-octene having a melt index of 1000 g/10 minutes and a density of 0.87 g/cm$^3$ available from the Dow Chemical Co. in Freeport, Tex.; 20% by weight Kraton® G 1730, a styrene-ethylene/propylene-styrene-ethylene/propylene block copolymer available from Shell Chemical Co. in Houston, Tex.; 39.5% by weight of a dicyclopentadiene tackifying resin having a $T_g$ of about 81° C. onset temperature, a molecular weight, $M_z$, of about 2200 g/mole, $M_n$ of about 500 g/mole and $M_w$ of about 800 g/mole relative to polystyrene standards; 20% by weight Bareco® PX-100, a high melting point synthetic resin and 0.5% by weight Irganox® 1076 hindered phenolic antioxidant. The following data was obtained:

| Physical Properties | Example 32 |
|---|---|
| Viscosity @ ~177° C. (cPs) | 4,465 |
| Programmed 100 g oven peel (° C.) | 77 |
| Cold Crack (° C.) | −1 |
| Ambient range (100 g peel-cold crack) (° C.) | 61 |
| Ultimate Tensile (psi) | 1,021 (~72 kg/cm$^2$) |
| Yield Point (psi) | 310 (~22 kg/cm$^2$) |
| Elongation at Break (%) | 690 |

What is claimed is:

1. A hot melt adhesive composition comprising:
   a) from about 5 wt-% to about 50 wt-% of at least one homogeneous linear or substantially linear ethylene/alpha-olefin interpolymer characterized as having a density from 0.850 to 0.965 g/cm$^3$;
   b) from about 1 wt-% to about 20 wt-% of at least one block copolymer; and
   c) from about 30 wt-% to about 75 wt-% of at least one tackifying resin;
   wherein said adhesive composition has a viscosity of less than about 20,000 cps at about 177° C.

2. The hot melt adhesive composition of claim 1 further comprising about 10 wt-% to about 55 wt-% of at least one wax.

3. The hot melt adhesive composition of claim 2 wherein the wax is a synthetic high melting point wax.

4. The hot melt adhesive composition of claim 1 further comprising about 10 wt-% to about 40 wt-% of at least one oil.

5. The hot melt adhesive composition of claim 1 wherein the block copolymer has a hydrogenated mid-block.

6. The hot melt adhesive composition of claim 5 wherein the mid-block of the block copolymer is ethylene/butylene, ethylene/propylene, and mixtures thereof.

7. The hot melt adhesive composition of claim 1 wherein the block copolymer has a diblock content from 0 wt-% to about 20 wt-%.

8. The hot melt adhesive of claim 1 wherein the styrene content of the block copolymer ranges from about 5 wt-% to about 20 wt-%.

9. The hot melt adhesive of claim 1 wherein the solution viscosity of the block copolymer is less than 5000 for a 25 wt-% solution.

10. The hot melt adhesive of claim 1 wherein the block copolymer has a high vinyl content midblock.

11. The hot melt adhesive of claim 1 wherein the programmed oven peel is greater than about 55° C.

12. The hot melt adhesive of claim 1 wherein the programmed oven peel is greater than about 60° C.

13. The hot melt adhesive of claim 5 wherein the SAFT is greater than about 60° C.

14. The hot melt adhesive of claim 1 wherein the viscosity is less than about 5000 cPs at 150° C.

15. The hot melt adhesive of claim 4 wherein the loop tack is greater than about 4 lbs (1.8 kg).

16. A hot melt adhesive composition comprising:
   a) from about 5 wt-% to about 40 wt-% of at least one homogeneous ethylene/alpha-olefin interpolymer characterized as having a density from 0.850 to 0.965 g/cm$^3$ and a melt index of at least about 100 g/10 min;
   b) from about 1 wt-% to about 20 wt-% of at least one block copolymer; and
   c) from about 10 wt-% to about 75 wt-% of at least one tackifying resin.

17. The hot melt adhesive of claim 16 wherein the melt index of the homogeneous ethylene/alpha-olefin interpolymer is greater than about 500 g/10 min.

18. A hot melt adhesive composition comprising:
   a) from about 5 wt-% to about 40 wt-% of at least one homogeneous ethylene/alpha-olefin interpolymer characterized as having a density from 0.850 to 0.965 g/cm$^3$;
   b) from about 1 wt-% to about 20 wt-% of at least one block copolymer; and
   c) from about 10 wt-% to about 75 wt-% of at least one tackifying resin.

19. A book comprising a book block and cover and bonded with the adhesive of claim 16.

20. A tape comprising a substrate coated with the adhesive of claim 4.

21. A case, carton or tray comprising a substrate bonded with the adhesive of claim 1.

22. A hot melt adhesive composition comprising:
   a) from about 10 wt-% to about 50 wt-% of at least one homogeneous linear or substantially linear ethylene/alpha-olefin interpolymer characterized as having a density from 0.850 to 0.965 g/cm$^3$;
   b) from about 1 wt-% to about 20 wt-% of at least one block copolymer having at least two blocks wherein the first block is a non-elastomeric polymer block and the second block is an unsaturated conjugated diene or hydrogenated version thereof; and
   c) from about 10 wt-% to about 75 wt-% of at least one tackifying resin,
   wherein said adhesive composition has a viscosity of less than about 20,000 cps at about 177° C.

23. The hot melt adhesive composition of claim 22 further comprising about 10 wt-%o to about 55 wt-% of at least one wax.

24. The hot melt adhesive composition of claim 23 wherein the wax is a synthetic high melting point wax.

25. The hot melt adhesive composition of claim 22 further comprising about 10 wt-% to about 40 wt-% of at least one oil.

26. The hot melt adhesive of claim 22 wherein the adhesive has a storage modulus less than about 1×10$^7$ dynes/cm$^2$.

27. The hot melt adhesive composition of claim 22 wherein the block copolymer has a hydrogenated mid-block.

28. The hot melt adhesive composition of claim 27 wherein the mid-block of the block copolymer is ethylene/butylene, ethylene/propylene, and mixtures thereof.

29. The hot melt adhesive composition of claim 22 wherein the block copolymer has a solution viscosity ranging from about 100 cPs at about 77° F. for a 25 wt-% solution to about 300 cPs at 77° F. for a 10 wt-% solution.

30. The hot melt adhesive of claim 22 wherein the programmed oven peel is greater than about 55° C.

31. The hot melt adhesive of claim 22 wherein the programmed oven peel is greater than about 60° C.

32. The hot melt adhesive of claim 26 wherein the SAFT is greater than about 60° C.

33. The hot melt adhesive of claim 22 wherein the viscosity is less than about 5000 cPs at 150° C.

34. The hot melt adhesive of claim 26 wherein the loop tack is greater than about 4 lbs (1.8 kg).

35. A hot melt adhesive composition comprising:
   a) from about 10 wt-% to about 25 wt-% of at least one homogeneous linear or substantially linear ethylene/alpha-olefin interpolymer characterized as having a density from 0.850 to 0.965 g/cm³ and a melt index of greater than about 500 g/10 min;

b) from about 1 wt-% to about 20 wt-% of at least one block copolymer having at least two blocks wherein the first block is a non-elastomeric polymer block and the second block is an unsaturated conjugated diene or hydrogenated version thereof; and c) from about 10 wt-% to about 75 wt-% of at least one tackifying resin, wherein said adhesive composition has a viscosity of less than about 20,000 cps at about 177° C.

36. A hot melt adhesive composition comprising:

a) from about 5 wt-% to about 50 wt-% of at least one homogeneous linear or substantially linear ethylene/alpha-olefin interpolymer characterized as having a density from 0.850 to 0.965 g/cm³;

b) from about 10 wt-% to about 20 wt-% of at least one block copolymer having at least two blocks wherein the first block is a non-elastomeric polymer block and the second block is an unsaturated conjugated diene or hydrogenated version thereof; and c) from about 10 wt-%o to about 75 wt-% of at least one tackifying resin.

37. A book comprising a book block and cover and bonded with the adhesive of claim 22.

38. A tape comprising a substrate coated with the adhesive of claim 26.

39. A feminine napkin comprising a body fluid impermeable substrate coated with the adhesive of claim 26.

40. A case, carton or tray comprising a substrate bonded with the adhesive of claim 22.

41. A medical device or bandage comprising a substrate and the adhesive of claim 26.

42. The hot melt adhesive composition of claim 22 wherein said block copolymer is present in an amount ranging from about 10 to 20 wt-%.

43. The hot melt adhesive of claim 22 wherein the density of the interpolymer ranges from about 0.850 to about 0.885 g/cm³.

44. The hot melt adhesive of claim 35 wherein the density of the interpolymer ranges from about 0.850 to about 0.885 g/cm³.

45. The hot melt adhesive of claim 36 wherein the density of the interpolymer ranges from about 0.850 to about 0,885 g/cm³.

46. The hot melt adhesive of claim 22 wherein said adhesive has a higher peel relative to an adhesive composition based on block copolymer or interpolymer alone.

47. The hot melt adhesive of claim 35 wherein said adhesive has a higher peel relative to an adhesive composition based on block copolymer or interpolymer alone.

48. The hot melt adhesive of claim 36 wherein said adhesive has a higher peel relative to an adhesive composition based on block copolymer or interpolymer alone.

49. The hot melt adhesive of claim 22 wherein the viscosity is less than about 15,000 cps at 177° C.

50. The hot melt adhesive of claim 22 wherein the viscosity is less than about 10,000 cps at 177° C.

51. The hot melt adhesive of claim 35 wherein the viscosity is less than about 15,000 cps at 177° C.

52. The hot melt adhesive of claim 35 wherein the viscosity is less than about 10,000 cps at 177° C.

53. A hot melt adhesive composition comprising:

a) from about 10 wt-% to about 50 wt-% of at least one homogeneous linear or substantially linear ethylene/alpha-olefin interpolymer characterized as having a density from 0.850 to 0.965 g/cm³;

b) from about 2 wt-% to 20 wt-% of at least one block copolymer having at least two blocks wherein the first block is a non-elastomeric polymer block and the second block is an unsaturated conjugated diene or hydrogenated version thereof; and c) from about 10 wt-% to about 75 wt-% of at least one tackifying resin.

54. A hot melt adhesive composition comprising:

a) from about 10 wt-% to about 50 wt-% of at least one homogeneous linear or substantially linear ethylene/alpha-olefin interpolymer characterized as having a density from 0.850 to 0.965 g/cm³;

b) from about 1 wt-% to about 20 wt-% of at least one block copolymer having at least two blocks wherein the first block is a non-elastomeric polymer block and the second block is an unsaturated conjugated diene or hydrogenated version thereof; and c) from about 35 wt-% to about 75 wt-% of at least one tackifying resin.

55. A hot melt adhesive composition comprising:

a) from about 10 wt-% to about 25 wt-% of at least one homogeneous linear or substantially linear ethylene/alpha-olefin interpolymer characterized as having a density from 0.850 to 0.965 g/cm³ and a melt index of greater than about 500 g/10 min;

b) from about 1 wt-% to about 20 wt-% of at least one block copolymer having at least two blocks wherein the first block is a non-elastomeric polymer block and the second block is an unsaturated conjugated diene or hydrogenated version thereof; and c) from about 35 wt-% to about 75 wt-% of at least one tackifying resin.

56. A hot melt adhesive composition comprising:

a) from about 5 wt-% to about 50 wt-% of at least one homogeneous linear or substantially linear ethylene/alpha-olefin interpolymer characterized as having a density from 0.850 to 0.965 g/cm³;

b) from about 10 wt-% to about 20 wt-% of at least one block copolymer having at least two blocks wherein the first block is a non-elastomeric polymer block and the second block is an unsaturated conjugated diene or hydrogenated version thereof; and c) from about 35 wt-% to about 75 wt-% of at least one tackifying resin.

57. The hot melt adhesive composition of claim 27 wherein the mid-block of the block copolymer is ethylene/butylene, ethylene/propylene, or a combination thereof.

* * * * *